United States Patent
Van Den Bos

(10) Patent No.: US 9,643,575 B2
(45) Date of Patent: May 9, 2017

(54) DEVICE AND COUPLING FOR A SWING DOWN STABILISER LEG

(71) Applicant: Bos Fabrication Engineering Services Pty Ltd, St Marys, NSW (AU)

(72) Inventor: Jurgen Van Den Bos, St Marys (AU)

(73) Assignee: BOS Fabrication Engineering Services Pty Ltd, St. Marys, NSW (AU)

( * ) Notice: Subject to any disclaimer, the term of this patent is extended or adjusted under 35 U.S.C. 154(b) by 0 days.

(21) Appl. No.: 14/957,307

(22) Filed: Dec. 2, 2015

(65) Prior Publication Data

US 2016/0229379 A1    Aug. 11, 2016

(30) Foreign Application Priority Data

Dec. 2, 2014  (AU) ................................. 2014271244

(51) Int. Cl.
*A47G 29/00* (2006.01)
*B60S 9/04* (2006.01)

(52) U.S. Cl.
CPC ...................... *B60S 9/04* (2013.01)

(58) Field of Classification Search
CPC ........... B60S 9/04; F16M 11/16; F16M 11/10; F16M 11/38
USPC .................................. 248/206.1, 291.1, 688
See application file for complete search history.

(56) References Cited

U.S. PATENT DOCUMENTS

| 8,733,779 | B2 * | 5/2014 | Arakelian | B60D 1/665 |
| | | | | 280/475 |
| 2011/0011678 | A1 * | 1/2011 | Sheffield | E04G 1/24 |
| | | | | 182/141 |

* cited by examiner

*Primary Examiner* — Todd M Epps
(74) *Attorney, Agent, or Firm* — Kilpatrick Townsend & Stockton LLP

(57) ABSTRACT

The invention relates to a swing down stabiliser leg for supporting a caravan or the like. In particular, the invention relates to a device for locking a swing down stabiliser leg in a raised or lowered position, including a handle connected to a shuttle that moves relative to a body of the device, wherein the shuttle is arrange for connection to a locking pin and the handle is coupled to the shuttle by a pivot connection whereby to move the shuttle and locking pin axially either as a result of corresponding axial movement of the handle or as a result of lever action of the handle. The invention also relates to a coupling to connect a foot plate to the leg.

11 Claims, 11 Drawing Sheets

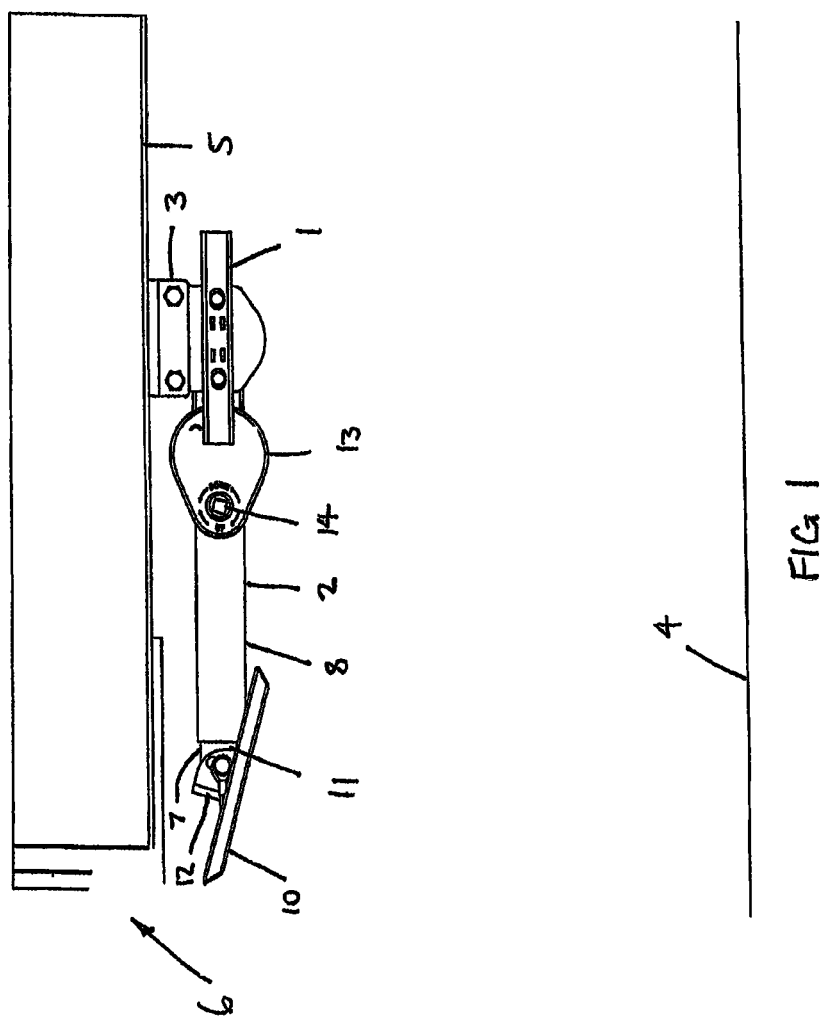

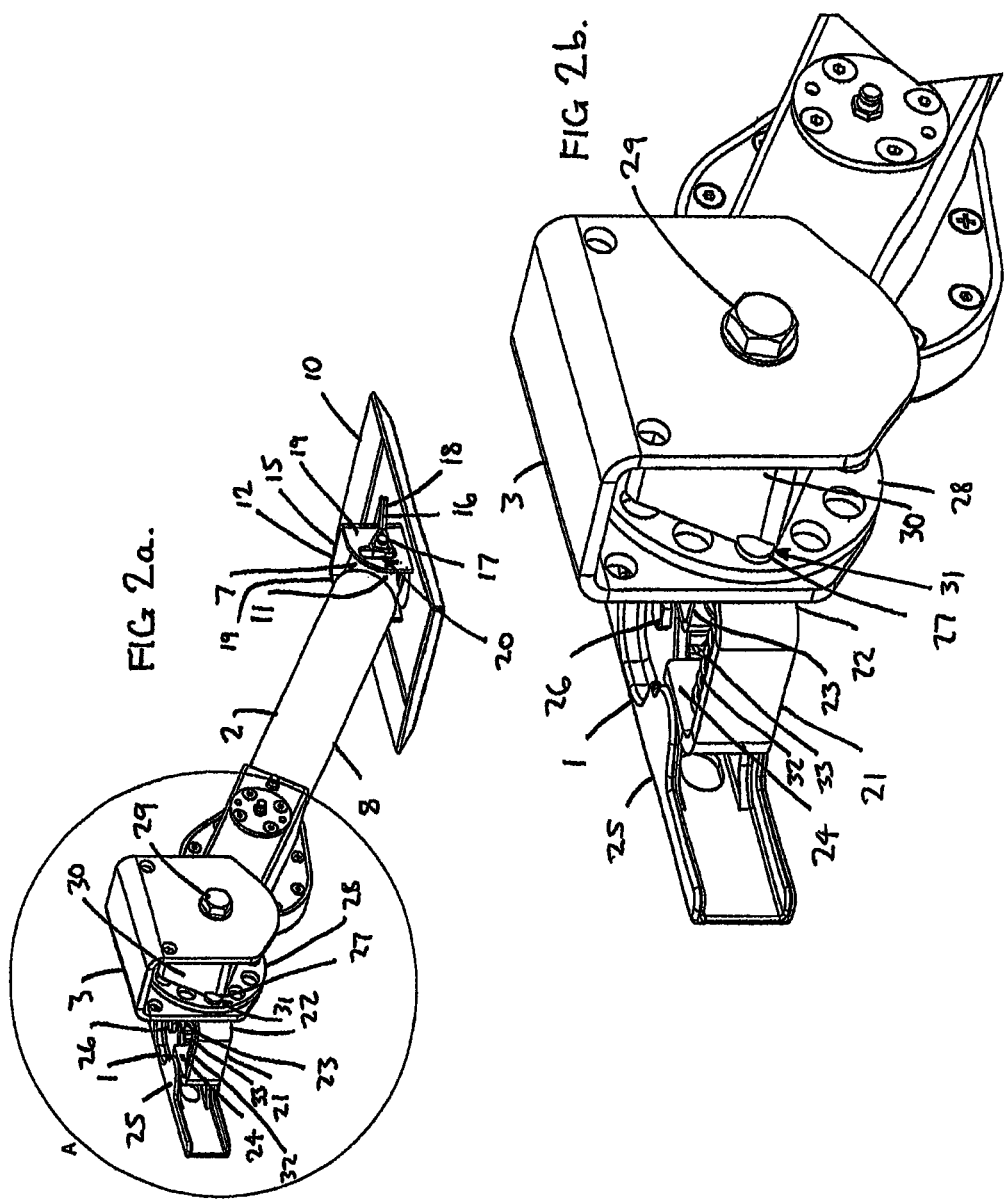

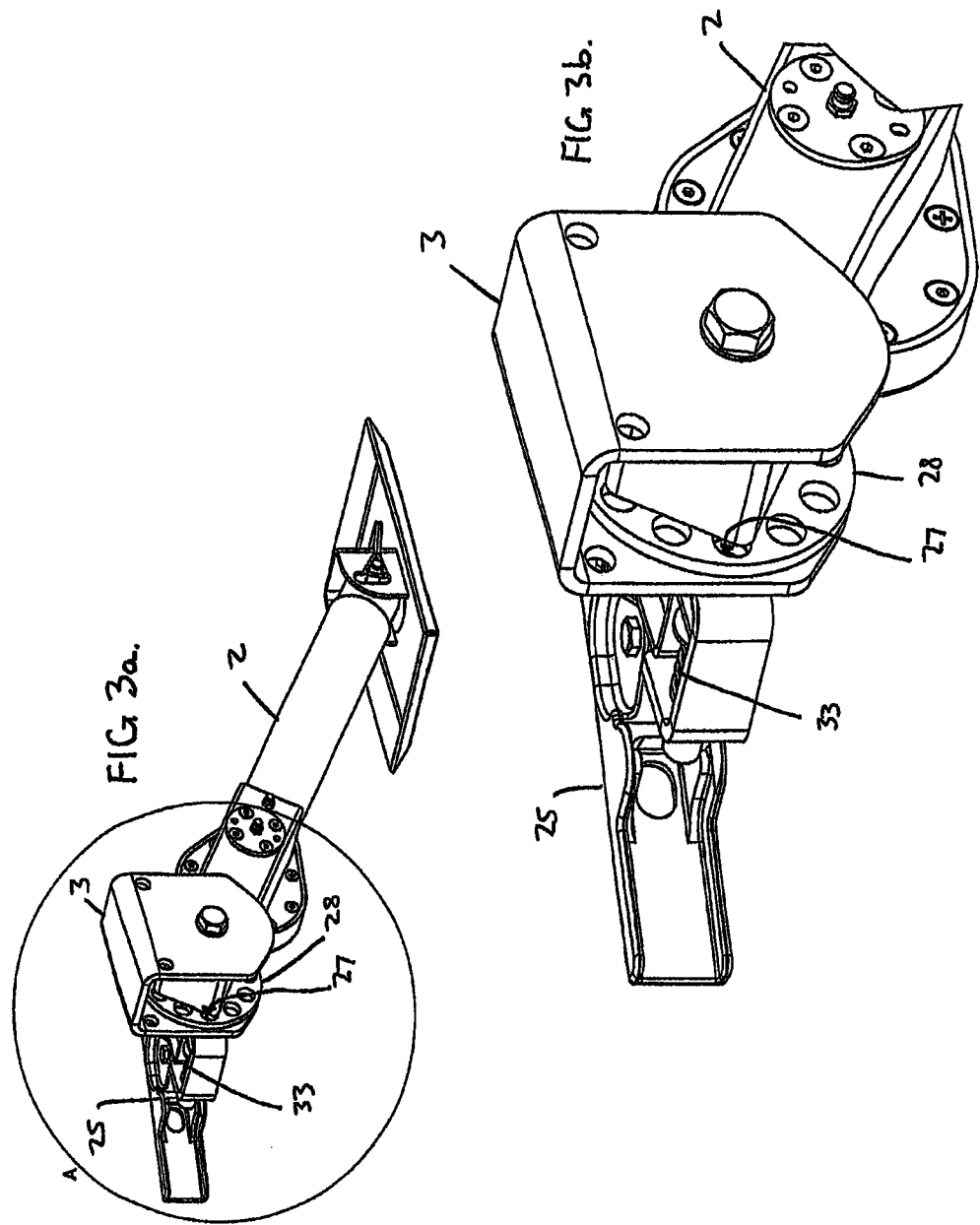

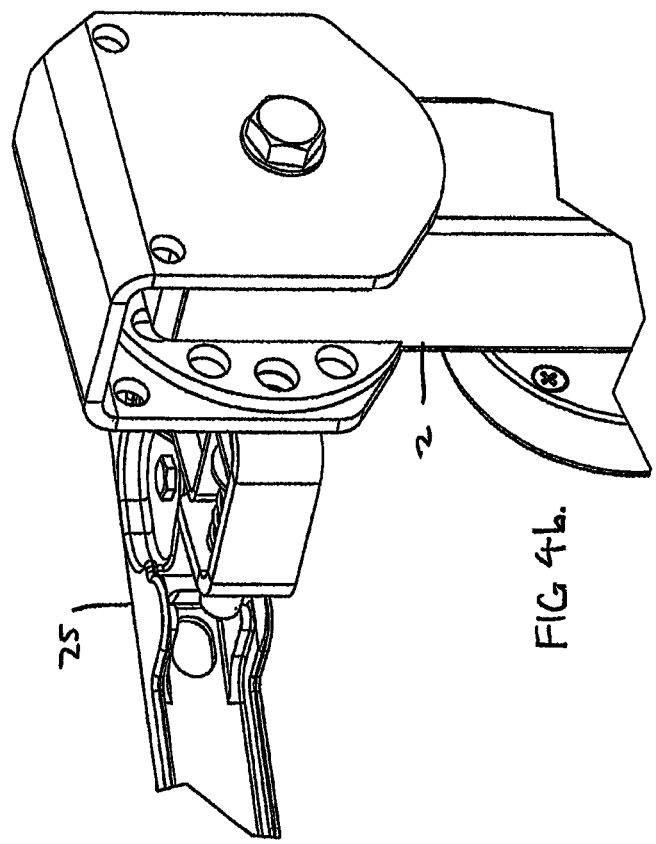
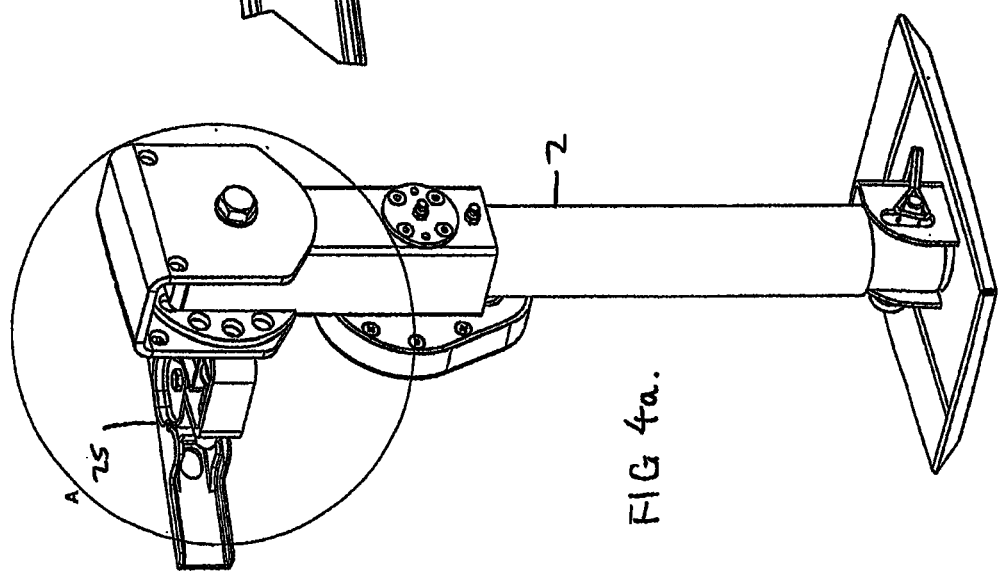
FIG 4b.
FIG 4a.

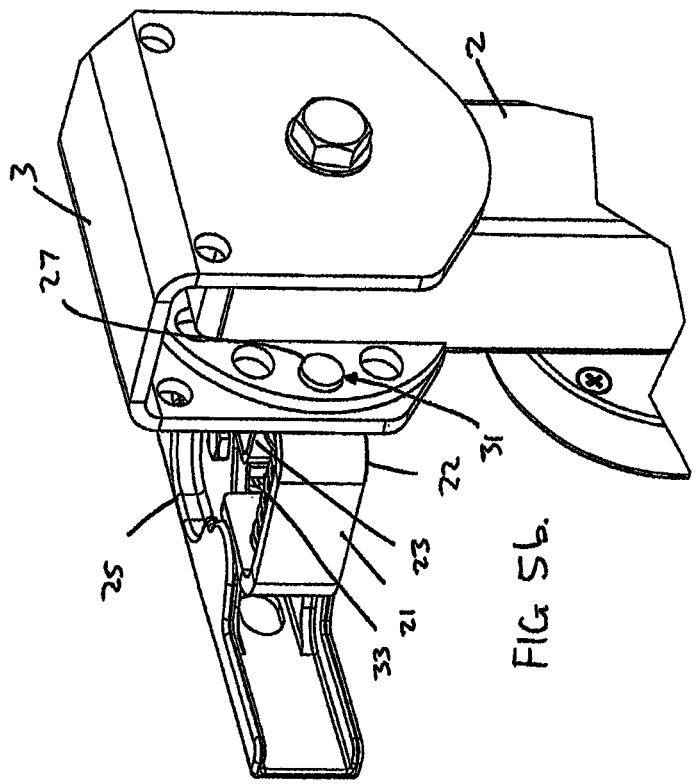
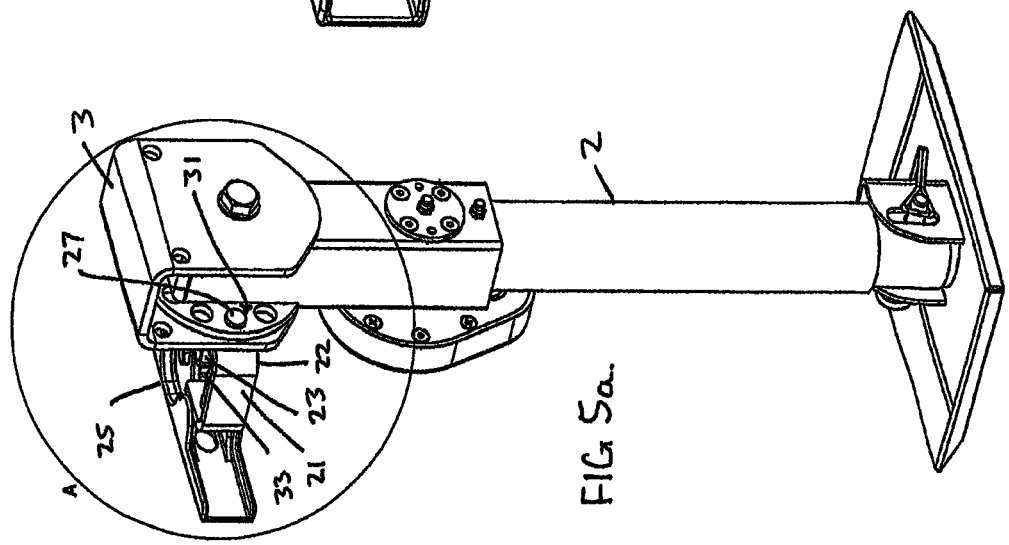

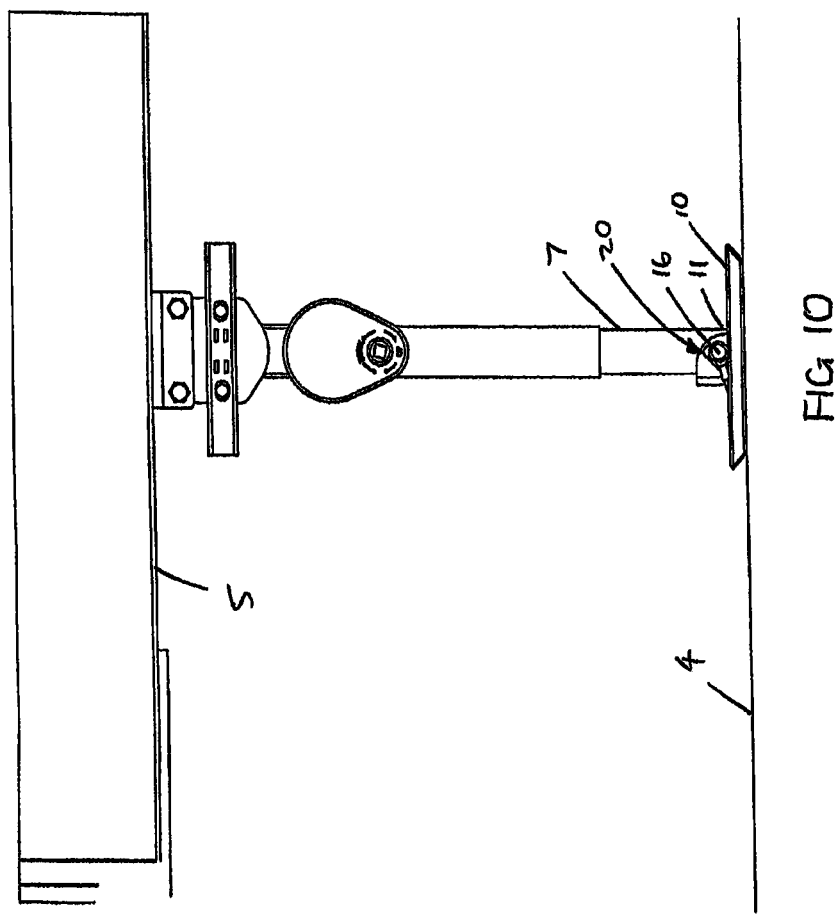

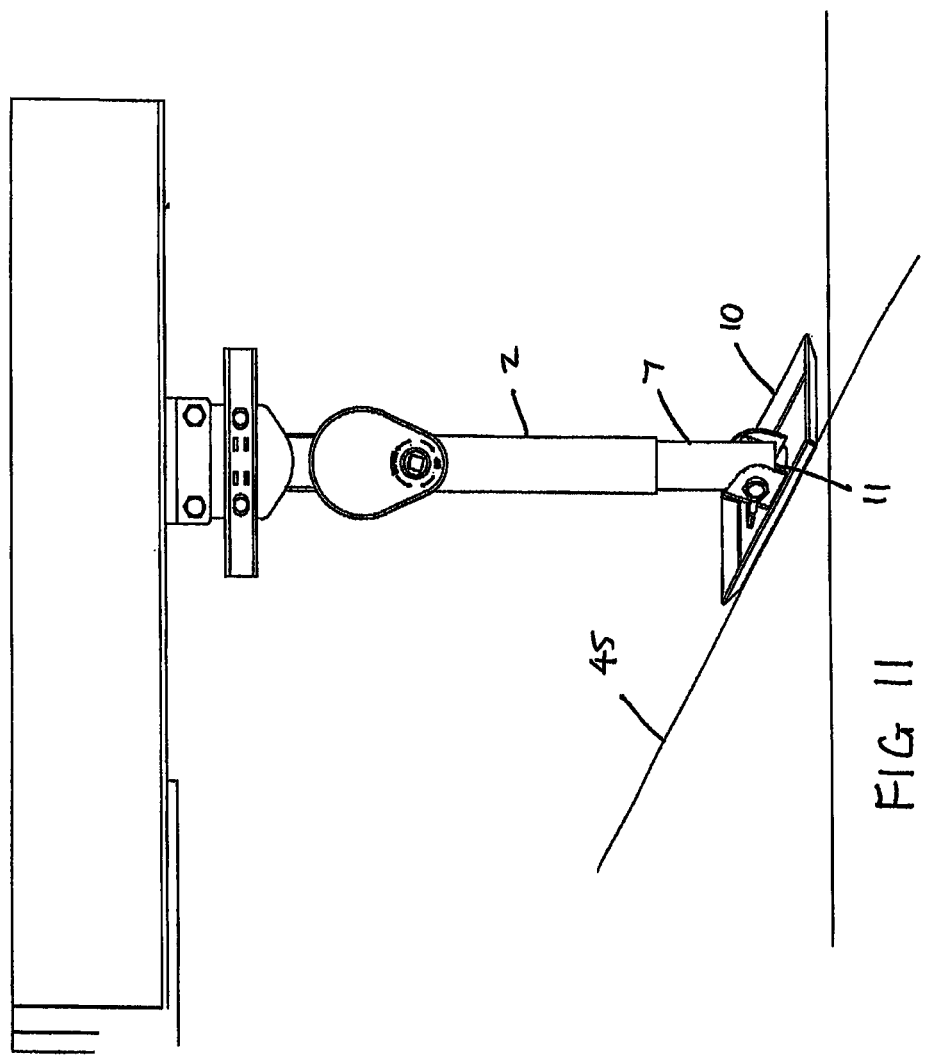

DEVICE AND COUPLING FOR A SWING DOWN STABILISER LEG

RELATED APPLICATION

This application claims the benefit of priority from Australian Patent Application AU2014271244, filed on Dec. 2, 2014, the contents of which are incorporated by reference.

FIELD OF THE INVENTION

This invention relates generally to a swing down stabiliser leg and more particularly to a device to lock and release the leg. The invention also relates to a coupling to connect a foot plate to the leg.

BACKGROUND OF THE INVENTION

A known form of swing down stabiliser leg is mounted to a frame of a caravan or the like and swings between a raised position and a lowered position to engage a ground surface.

A bracket connects the leg to the frame and a locking pin is used to secure the leg in both raised and lowered positions. The pin extends between the bracket and a locking plate associated with the leg in order to lock the position of the leg relative to the bracket. The pin is spring biased into an engaged condition, where the pin extends through an aperture in the locking plate, and a release condition, where the pin is removed from the plate and the leg is free to move. A pull handle is provided to move the pin into the release condition.

The leg is formed of tubular inner and outer sections, with matching square profiles to prevent relative rotational movement between the sections. The inner section is arranged to telescope in and out of the outer section. A hinge pin connects the inner tubular section to a ground engaging foot plate. The weight load of the caravan is transferred through the hinge pin to the ground via the foot plate. The foot plate is able to pivot around the hinge pin to accommodate variation in the slope of the ground.

OBJECT OF THE INVENTION

The invention seeks to provide either an alternative device to lock and release a swing down stabiliser leg and/or an alternative coupling for the foot plate attached to the leg.

SUMMARY OF THE INVENTION

In accordance with the invention, there is provided a device for locking a swing down stabiliser leg in a raised or lowered position, including a handle connected to a shuttle that moves relative to a body of the device, wherein the shuttle is arranged for connection to a locking pin and the handle is coupled to the shuttle by a pivot connection whereby to move the shuttle and locking pin axially either as a result of corresponding axial movement of the handle or as a result of lever action of the handle, wherein the pivot connection is intermediate to both ends of the handle such that the pivot connection provides a first fulcrum point for the handle and second and third fulcrum points are provided either side of the pivot connection around which the handle rocks when lever action is applied through leverage at either of the ends of the handle.

Preferably, the device includes a biasing member to urge the shuttle and handle into an engaged condition, where the pivot pin projects out through the base to lock the swing leg against rotation.

Preferably, the device includes two locking pins that extend between the base and an end section of the body adjacent the handle.

Preferably, the biasing member includes a spring associated with each locking pin, to urge the shuttle and handle into the engaged condition.

Preferably, the end section includes shoulders that form the second and third fulcrum points for the handle.

In another aspect, there is provided a swing down stabiliser leg and a device, as described above, for locking the leg in a raised or lowered position.

Preferably the leg includes a coupling for attaching a foot plate to an end of a leg, including a mount with side walls and elongated slots formed in the side walls to receive a clip that connects the end of the leg into the mount.

Preferably, the mount is attached to the foot plate and the elongated slots are oriented substantially vertically so as to allow for relative vertical play between the clip and the foot plate, wherein the clip supports the weight of the foot plate when the foot plate hinges around the end of the leg, as the leg moves from a raised to a lowered position, and wherein the clip moves down the slots to allow the end of the leg to engage directly with the foot plate when in the lowered position, for transfer of weight load directly through to the foot plate.

In yet another aspect, there is provided a swing down stabiliser leg with a device for locking the swing leg, as described above, and a foot plate with a coupling, as also described above.

In yet another aspect, there is provided a handle for the above described device including a pivot connection intermediate ends of the handle, the pivot connection allowing the handle to connect with the shuttle of the device and move the shuttle axially as a result of corresponding axial movement of the handle, wherein the handle is also able to rock about the pivot connection and be leveraged relative to a body of the device in order to axially advance the shuttle as a result of associated lever action from either end of the handle in a forward or reverse direction relative to the axial direction.

In another aspect, there is provided a device for translating a moveable member in an axial direction including a handle connected to the member that moves relative to a body of the device, wherein the handle is coupled to the member by a pivot connection whereby to move the member axially either as a result of corresponding axial movement of the handle or as a result of lever action of the handle, wherein the pivot connection is intermediate ends of the handle whereby the handle rocks about the pivot connection and is leveraged relative to the body of the device in order to axially advance the member as a result of associated lever action from either end of the handle.

BRIEF DESCRIPTION OF THE DRAWINGS

The invention is described, by way of non-limiting example only, with reference to the accompanying drawings, in which:

FIG. 1 is a front view of a swing down stabiliser leg and a device attached to a frame;

FIG. 2a is a rear perspective view of the device in a locked condition, with the leg in a partially lowered position;

FIG. 2b is an enlarged section A from FIG. 2a;

FIG. 3a is a rear perspective view similar to FIG. 2a, with the device in a release condition;

FIG. 3b is an enlarged section A from FIG. 3a;

FIG. 4a is a rear perspective view similar to FIG. 3a, showing the device in the release condition and the leg in a lowered position;

FIG. 4b is an enlarged section A from FIG. 4a;

FIG. 5a is a rear perspective view similar to FIG. 4a, with the device in a locked condition;

FIG. 5b is an enlarged section A from FIG. 5a;

FIG. 10 is a front view showing the leg extended to engage a ground surface; and FIG. 11 illustrates a foot that is pivoted to accommodate a sloping ground surface.

DETAILED DESCRIPTION OF THE DRAWINGS

Figure 6:
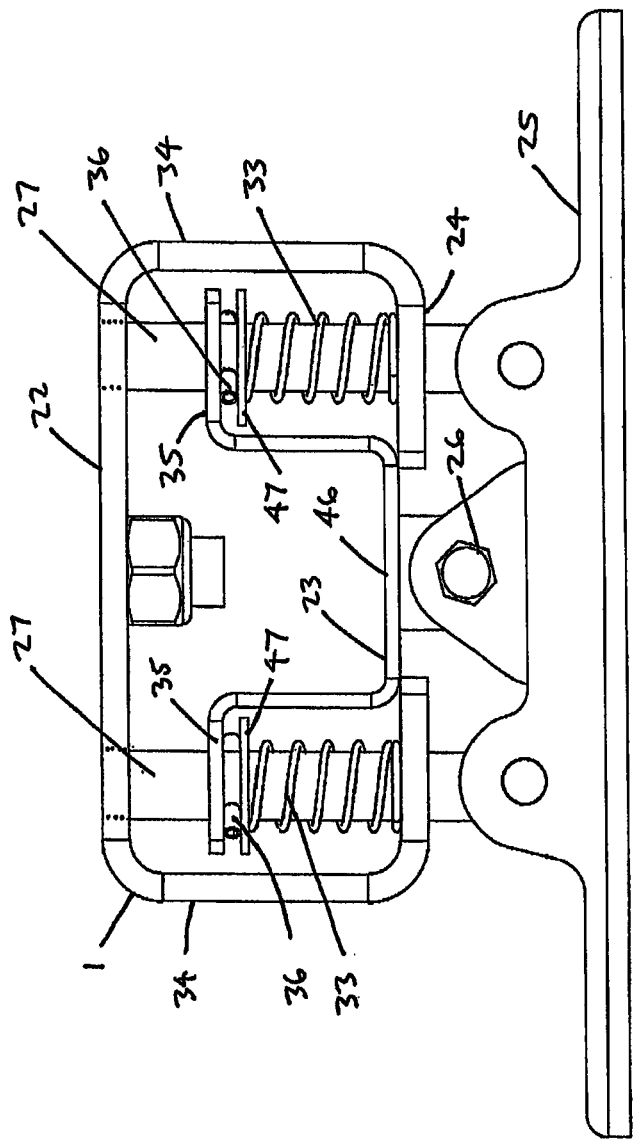
FIG. 6 is a plan view illustrating the device in a release condition, in a first configuration.

FIG. 1 shows a device 1 for locking a swing down stabiliser leg 2 to bracket 3, with the leg 2 in an elevated position relative to a ground surface 4. The bracket 3 is mounted to a frame 5 of a vehicle 6 such as a caravan or the like.

The leg 2 is formed of a tubular inner section 7 and a tubular outer section 8, configured for telescopic movement. A foot plate 10 is attached to an end 11 of the inner section 7 of the leg 2 by a coupling 12. A gearbox 13 with a rotary connector 14 is provided to telescopically drive the inner section 7 relative to the outer section 8.

FIG. 2a shows the coupling 12 in more detail as including a mount 15 connected to the foot plate 10 and a clip 16 that couples the end 11 of the tubular inner section 7 of the leg 2 into the mount 15. The clip 16 is formed of a peg 17 that passes through the end 11 and a loop 18 that is hooked over the peg 17 to secure the clip 16 to the leg 2. The loop 18 can be unhooked to allow the peg 17 to be removed, in order for the foot plate 10 to be swapped out, if required.

The mount 15 includes two side walls 19 that project upwardly from the foot plate 10. The side walls 19 have elongate slots 20 arranged in a vertical orientation so that a degree of play exists between the clip 16 and the mount 15 so that the coupling 12 holds the foot plate 10 on the leg 2 in a relatively loose manner.

In particular, the clip 16 supports the weight of the foot plate 10 as the leg 2 is lowered, however, the vertical play between the clip 16 and the slots 20 means the clip 16 can slide down the slots 20 when the leg 2 is in a fully lowered position, to allow for direct abutting engagement of the end 11 with the foot plate 10.

Both the tubular outer section 8 and the tubular inner section 7 have a circular profile, which allows relative rotation between the two sections 7, 8, if required, such as for positioning the foot plate 10 in an appropriate orientation.

The leg 2, as shown in FIG. 2, is held by the device 1 in a partially lowered position. The device 1 includes a body 21 with a base 22 attached to the bracket 3. A moveable member in the form of a shuttle 23 is seated inside the body 21 and moves between the base 22 and an end section 24 of the device 1 adjacent a handle 25 which is coupled to the shuttle 23 by a pivot connection 26. A locking pin 27 extends from the shuttle 23, through the base 22 and the bracket 3 and into a locking plate 28 of the leg 2. The locking plate 28 and the leg 2 rotate about a bolt 29 that passes through a top end 30 of the leg 2 and into the bracket 3.

A series of apertures 31 are provided around a circumference of the locking plate 28 and these align with the locking pin 27 of the device 1 to secure the leg 2 in position.

The device 1 also includes a biasing member 32 which is preferably in the form of a spring 33 although other suitable biasing means may instead be used. When the device 1 is in an engaged condition, as shown, the spring 33 urges the shuttle 23 toward the base 22 which holds the pin 27 in an extended position, projecting out from the base 22 to lock the leg 2 against rotation relative to the bracket 3.

To further rotate the leg 2 into a lowered position, the device 1 can be moved into a release condition, where the pin 27 is withdrawn from the locking plate 28 by pulling on the handle 25, in order to draw the shuttle 23 away from the base 22 toward the end section 24 of the device 1.

FIG. 3 illustrates the release condition of the device 1, where the handle 25 has been pulled against the bias of the spring 33 to retract the locking pin 27 from the locking plate 28 so that the leg 2 is free to rotate relative to the bracket 3.

FIG. 4 shows the leg 2 in a fully lowered position, with the handle 25 still pulled.

FIG. 5 shows the handle 25 returned to the engaged condition, where the shuttle 23 is again moved toward the base 22 of the body 21 under action of the spring 33 so that the pin 27 again projects through the associated aperture 31 to lock the leg 2 relative to the bracket 3.

FIG. 6 shows the device 1 as including two locking pins 27 that extend parallel to sides 34 of the device 1, between the base 22 and the end section 24. The pins 27 each have a lug 36 to hold a washer 47 that provides a seat for the associated spring 33. The shuttle 23 is mounted to the pins 27 via feet 35 that are arranged to slide along the pins 27 and engage the lugs 36 to pull the pins 27 in tandem toward the end section 24, against the bias of the springs 33. The feet 35 are connected by a bridging piece 46 where the pivot connection 26 couples the handle 25 to the shuttle 23.

The device 1 is shown in the release condition where the handle 25 has been pulled to draw the shuttle 23 axially toward the end section 24 of the device 1 against the bias of the springs 33, so that the pins 27 are refracted into the base 22 while projecting out through the end section 24.

As soon as the pulling force is removed, the springs 33 will act against the washers 47 to push the pins 27 back through the base 22 in tandem. The action of the lugs 36 on the feet 35 of the shuttle 23 will also assist in returning the handle 25 to the original position.

Figure 7:
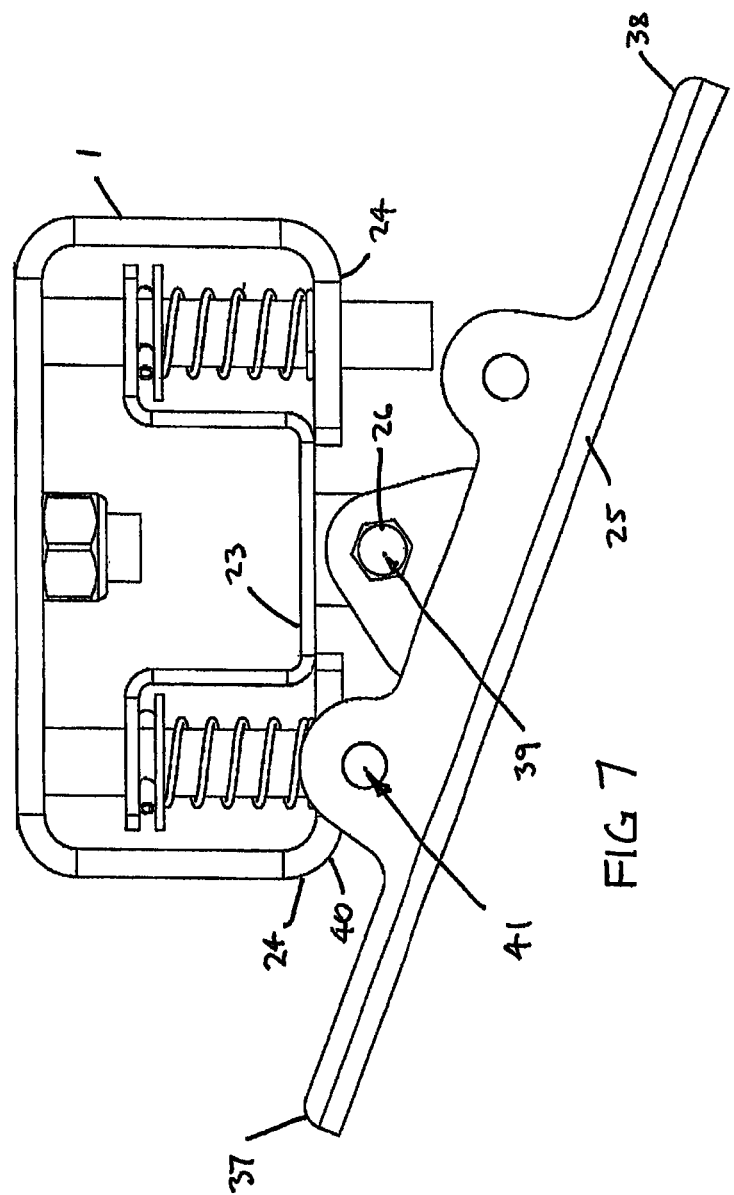
FIG. 7 is a plan view illustrating the device in a release condition, in a second configuration.

With reference now to FIG. 7, the handle 25 is shown pivoted by advancing one end 37 of the handle 25 toward the end section 24 or by pulling the other end 38 of the handle 25 away from the end section 24.

As a result, the handle 25 acts as a lever to axially advance the shuttle 23 toward the end section 24, with the pivot connection 26 providing a first fulcrum point 39 intermediate ends 37, 38 of the handle 25. For that purpose, a shoulder 40 of the end section 24 acts as a second fulcrum point 41.

Figure 8:
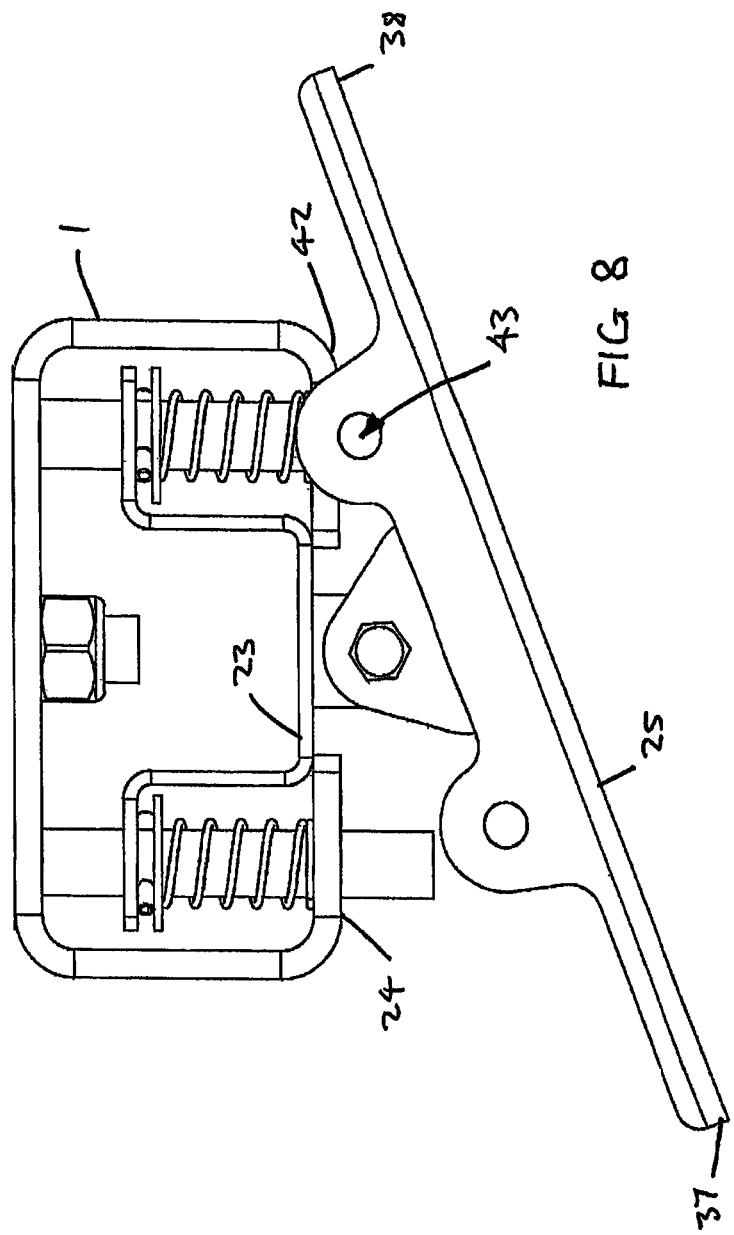
FIG. 8 is a plan view illustrating the device in a release condition, in a third configuration.

With reference to FIG. 8, the handle 25 is shown pivoted in an opposite direction so that an opposite shoulder 42 of the end section 24 forms a third fulcrum point 43. Again, the device 1 is in a release condition and the position of the shuttle 23 is the same as shown in FIGS. 6 and 7.

All three fulcrum points 40, 41 and 43 are intermediate ends 37, 38 of handle 25 which means the handle 25 is able to rock about the end section 24 of the device 1 either by pulling or pushing one end 37 or 38 of handle 25 toward the end section 24. Alternatively, the handle 25 can be pulled axially away from the end section 24. The device 1 can thereby be moved into the release condition using any one of multiple actions.

Figure 9:
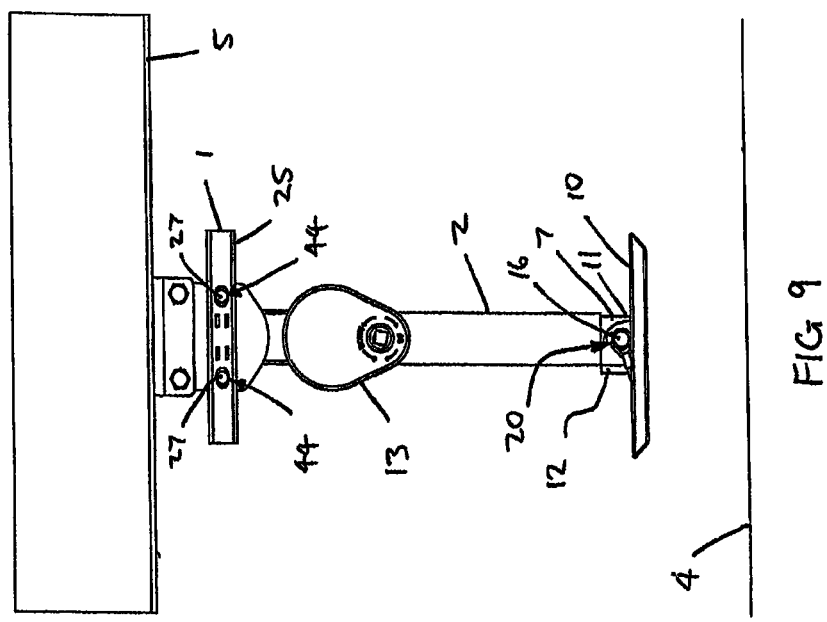
FIG. 9 is a front view showing the frame with the swing leg in the lowered position of FIG. 5.

FIG. 9 shows a front view of the device 1 with the leg 2 in the lowered position. The handle 25 has two openings 44 that are aligned with the pins 27. The openings 44 are arranged to allow view of the positioning of the respective pins 27.

FIG. 9 also shows the foot plate 10 in an elevated position over the ground surface 4. The foot plate 10 is held loosely on the leg 2 by the coupling 12. From that position, the gearbox 13 can be engaged to telescopically lower the inner section 7, until the foot plate 10 engages the ground surface 4, as shown in FIG. 10.

It may be appreciated the clip 16 only needs to support the weight of the foot plate until the foot plate is lowered onto the ground surface, after which the clip 16 can continue to travel down the slots 20 until the end 11 engages the foot plate 10 so that all weight load through the leg 2 can then be transferred directly to the foot plate 10 as a result of the end 11 of the leg 2 being in abutting engagement with the foot plate 10.

As such, weight load of the frame 5 can be transferred to the ground surface 4 directly through the leg 2 and there is no need for an intermediate hinge pin, as used in the prior art, that may be subject to fatigue and failure under such weight load.

With reference to FIG. 11, the leg 2 is also readily adapted to provide support on a sloping surface 45. As mentioned above, the inner section 7 of the leg 2 has a circular profile and can simply be rotated, as required, to position the foot plate 10 in line with the sloping surface 45, prior to the leg 2 being lowered onto the foot plate 10. As can be seen, the end 11 of the leg 2, or at least a peripheral section, is supported directly by the foot plate 10, even though the ground surface 45 is sloped. This again allows considerable weight load to be transferred directly through the leg 2 to the ground surface 45, as compared to the prior art arrangement where all weight load is passed through the hinge pin that connects the foot plate to the leg.

The device 1 has been described with reference to locking a swing down stabiliser leg that is locked in position using a locking pin 27 connected to a moveable member in the form of the shuttle 23. However, it should be appreciated the three way action of the handle 25 in so far as the push/pull axial movement combined with rocking in either direction to leverage movement of the shuttle 23 can equally be applied to other suitable applications and need not be limited to use solely with a locking pin and/or swing down stabiliser leg. In particular, the device 1 has applications to situations where axial translation of a moveable member is needed and the device 1 allows that action to be achieved using either corresponding axial movement of the handle and/or leverage applied to either end of the handle in either a forward or reverse direction relative to the axial direction of travel of the moveable member.

The invention has been described by way of non-limiting example and many modifications and variations may be made without departing from the spirit and scope of the invention described. For example, the invention has been described specifically with reference to dual locking pins, however, the pins may be replaced with any other form of locking latch, pawl, teeth or equivalent locking mechanism, as required.

LIST OF PARTS

1. Device
2. Swing leg
3. Bracket
4. Ground surface
5. Frame
6. Vehicle
7. Inner section
8. Outer section
9.
10. Foot plate
11. End
12. Coupling
13. Gearbox
14. Connector
15. Mount
16. Clip
17. Peg
18. Loop
19. Wall
20. Slot
21. Body
22. Base
23. Shuttle
24. End section
25. Handle
26. Pivot connection
27. Locking pin
28. Locking plate
29. Bolt
30. End
31. Aperture
32. Biasing member
33. Spring
34. Side
35. Feet
36. Lug
37. End
38. End
39. First fulcrum point
40. Shoulder
41. Second fulcrum point
42. Shoulder
43. Third fulcrum point
44. Opening
45. Sloped ground surface
46. Bridging piece
47. Washer

The invention claimed is:

1. A device for locking a swing down stabiliser leg in a raised or lowered position, including a handle connected to a shuttle that moves relative to a body of the device, wherein the shuttle is arranged for connection to a locking pin and the handle is coupled to the shuttle by a pivot connection whereby to move the shuttle and locking pin axially either as a result of corresponding axial movement of the handle or as a result of lever action of the handle, wherein the pivot connection is intermediate to both ends of the handle such that the pivot connection provides a first fulcrum point for the handle and second and third fulcrum points are provided either side of the pivot connection around which the handle rocks when lever action is applied through leverage at either of the ends of the handle.

2. The device of claim 1, further including a biasing member to urge the shuttle and handle into an engaged condition, where the locking pin projects out through the base to lock the swing leg against rotation.

3. The device of claim 2, wherein the device includes two locking pins that extend between the base and an end section of the body adjacent the handle.

4. The device of claim 3, wherein the biasing member includes a spring associated with each locking pin, to urge the shuttle and handle into the engaged condition.

5. The device of claim 4, wherein the end section includes shoulders that form the second and third fulcrum points for the handle.

6. A swing down stabiliser leg and the device of claim 1, for locking the leg in a raised or lowered position.

7. The swing down stabiliser leg of claim 6 including a coupling for attaching a foot plate to an end of the swing down stabiliser leg, including a mount with side walls and elongate slots formed in the side walls to receive a clip that connects the end of the leg into the mount.

8. The swing down stabiliser leg of claim 7, wherein the mount is attached to the foot plate and the elongate slots are oriented substantially vertically so as to allow for relative vertical play between the clip and the foot plate.

9. The swing down stabiliser leg of claim 7 further including a foot plate, wherein the mount of the coupling is provided on the foot plate.

10. A handle for the device of claim 1 wherein the pivot connection allows the handle to connect with the shuttle of the device and move the shuttle axially as a result of corresponding axial movement of the handle, wherein the handle is also able to rock about the pivot connection and be leveraged relative to a body of the device in order to axially advance the shuttle as a result of associated lever action from either end of the handle in a forward or reverse direction relative to the axial movement.

11. A device for translating a moveable member in an axial direction including a handle connected to the member that moves relative to a body of the device, wherein the handle is coupled to the member by a pivot connection whereby to move the member axially either as a result of corresponding axial movement of the handle or as a result of lever action of the handle, wherein the pivot connection is intermediate ends of the handle whereby the handle rocks about the pivot connection and is leveraged relative to the body of the device in order to axially advance the member as a result of associated lever action from either end of the handle.

* * * * *